United States Patent [19]

Karita et al.

[11] Patent Number: 4,868,431
[45] Date of Patent: Sep. 19, 1989

[54] LINEAR MOTOR WITH AN ELONGATED CORE USING OPPOSITELY POLARIZED MAGNETS TO MAXIMIZE PERPENDICULAR FLUX LINES

[75] Inventors: Mitsuji Karita; Tsutomu Shinya; Tetsuo Oishi, all of Ise, Japan

[73] Assignee: Shinko Electric Co., Ltd., Tokyo, Japan

[21] Appl. No.: 164,776

[22] Filed: Mar. 4, 1988

[30] Foreign Application Priority Data

Mar. 5, 1987 [JP] Japan ................................. 62-50775

[51] Int. Cl.$^4$ ............................................. H02K 41/02
[52] U.S. Cl. ....................................... 310/12; 318/135
[58] Field of Search ............................. 310/12, 13, 14; 318/135

[56] References Cited

U.S. PATENT DOCUMENTS 3,575,650 4/1971 Fengler .................................. 310/12

Primary Examiner—Patrick R. Salce
Assistant Examiner—Judson H. Jones
Attorney, Agent, or Firm—Cushman, Darby & Cushman

[57] ABSTRACT

The present invention is related to a linear motor which is composed of mainly:

(a) an elongated primary magnetic member for generating a traveling magnetic field traveling along the length;

(b) a secondary magnetic member for generating a stationary magnetic field, the secondary magnetic means having an elongated core, pair of permanent magnets attached to the core so as to sandwich the core from upper and lower sides, each pair being spaced constantly from each other, direction of polarity of the magnets forming a pair coinciding to each other, direction of polarity interchanging in turn from one pair to another; and (c) a support member supporting one of the primary magnetic member and the secondary magnetic member against the other so that the former is slidable along its axis against the latter.

16 Claims, 6 Drawing Sheets

LINEAR MOTOR WITH AN ELONGATED CORE USING OPPOSITELY POLARIZED MAGNETS TO MAXIMIZE PERPENDICULAR FLUX LINES

BACKGROUND OF THE INVENTION

The present invention relates to a linear motor which directly transforms electrical energy to linear mechanical energy. More precisely, the present invention relates to linear motors which are generally based on a same principle as a synchronous motor, having a permanent magnet as a rotator, or a brushless direct current motor. The difference is that both the primary magnetic means and the secondary magnetic means are developed linearly in the present invention.

Figure 10:
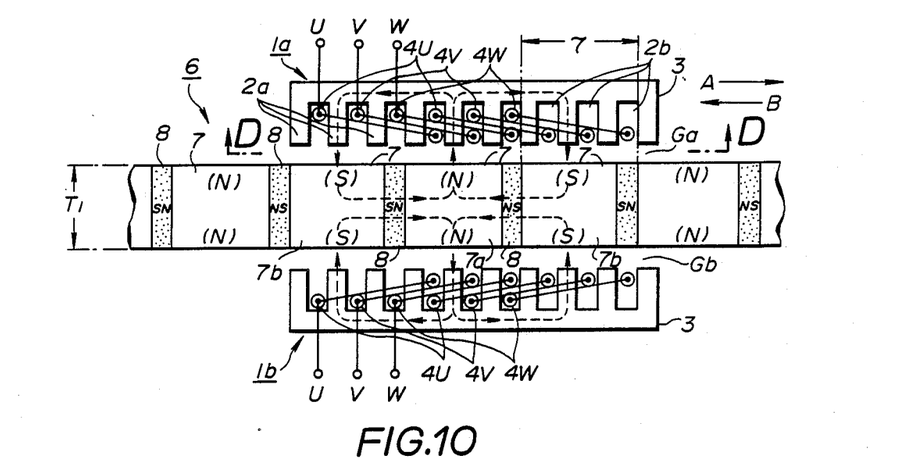
FIG. 10 shows a partially cut-off sketch of a conventional linear motor.
Figure 11:
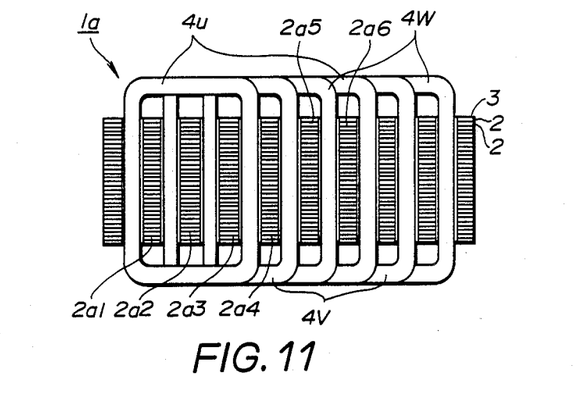
FIG. 11 shows schematically a primary magnetic means seen from D—D in FIG. 10.

Various linear motors of the type have been proposed as of the present time. Of these linear motors, FIGS. 10 and 11 show an example known as a double-sided linear motor wherein a synchronous motor having a permanent magnet as a rotator is developed linearly and two primary magnetic means 1a,1b are symmetrically disposed so as to hold therebetween a plate-formed secondary magnetic means 6. The primary magnetic means 1a comprises a primary core 3, having laminated iron plates forming teeth 2a and grooves 2b, and coils 4u,4v,4w disposed in the grooves 2b so as to wind around the teeth 2a.

FIG. 11 shows the primary magnetic means 1a seen from below as denoted by D—D in FIG.11. As shown in FIG. 11, the coil 4u is wound passing the first and fourth grooves 2b so as to hold the teeth 2a1,2a2,2a3 therein. The coil 4v is wound passing the second and fifth grooves 2b so as to hold the teeth 2a2,2a3,2a4 therein. The coil 4w is wound so as to hold the teeth 2a3,2a4,2a5. Then again, coil 4u is wound so as to hold the teeth 2a4,2a5,2a6, and so on.

When a three-phase electric current is supplied to the coils 4u,4v,4w, the primary magnetic means generate a traveling magnetic field traveling along its axis in the direction shown by A or B in FIG. 10.

The secondary magnetic means 6 comprises a plurality of parallelepiped secondary cores 7 made of iron and a plurality of plate-like permanent magnets 8 connected to each other in turn in a rod-like form, FIG.10. The permanent magnets 8 are so disposed as to the direction of magnetic polarity of adjacent magnets 8 opposes to each other. In other words, an N pole of a magnet 8 faces against an N pole of an adjacent magnet 8 through a secondary core 7 disposed therebetween. An S pole of a magnet also faces against an S pole of an adjacent magnet 8 in a same manner. As a result, magnetic flux generated around the secondary magnetic means 6 flows from a core 7a sandwiched between a pair of opposing N poles to a pair of adjacent cores 7b sandwiched between a pair of opposing S poles, passing through a space outside the magnet 8. Then the magnetic flux flows from the pair of cores 7b to the core 7a through the permanent magnets 8 sandwiched therebetween.

The distance between a pair of adjacent permanent magnets 8 is identical to three times the distance between adjacent teeth 2a. A support means (not shown) is provided between the primary magnetic means 1a,1b and the secondary magnetic means 6 so as to keep the distance therebetween constant and support the primary magnetic means 1a,1b slidably against the secondary magnetic means 6.

When a three-phase current is provided to the primary magnetic means 1a,1b, the magnetic means 1a,1b generates a traveling magnetic field traveling along the axis and the primary magnetic means 6 is propelled along the axis as a result.

Figure 12:
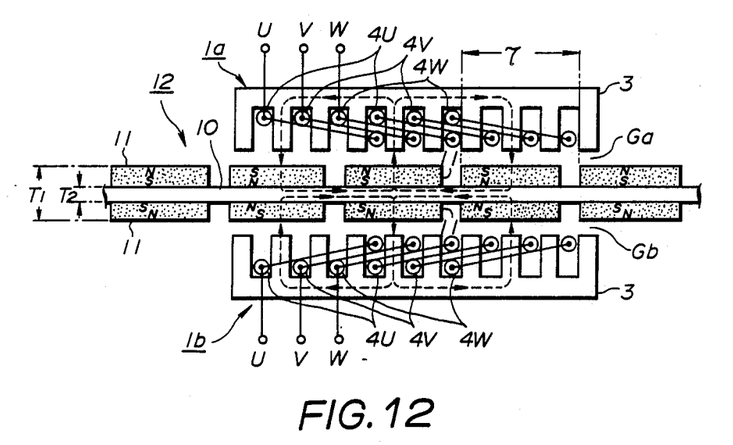
FIG. 12 is a partially cut-off sketch of another conventional linear motor.

FIG. 12 shows another conventional linear motor which has a same primary magnetic means 1a,1b. The difference in the secondary magnetic means 12 is that pairs of permanent magnets 11 are attached to an elongated iron core 10 sandwiching the core 10 therebetween. Directions of polarity of permanent magnets 11 within a pair are inverse to each other. Directions of polarity of adjacent magnets 11 attached on a same side of the core are also inverse from one to the other. In other words, N poles are facing to each other through the core 10 in a pair, S poles are facing to each other through the core 10 in an adjacent pair, and so on. As a result, magnetic flux flows from N poles of the magnets 11 facing outwards (distal N poles) to S poles facing outwards (distal S poles) of adjacent magnets 11 passing through a space therebetween. Magnetic flux flows from the distal S poles to proximate N poles of the same magnet at which the magnet 11 is connected to the core 10 (proximate N poles) through the magnet itself, and flows from the proximate N poles to adjacent proximate S poles passing through the core 10, as shown by dotted lines in FIG. 13.

(Problems encountered by the conventional linear motors)

The following problems resides in these above-mentioned conventional linear motors. That is, in order to make the conventional linear motor shown in FIG. 10 more compact, it is required to make the secondary core thinner. But this decreases the magnetic flux generated by the secondary core, resulting in consequently a decrease of propulsion force.

The conventional linear motor shown in FIG. 12, enables to make the secondary magnetic means thinner to some extent, but still has the following problem. When the thickness of the secondary core 10 becomes too small, the magnetic flux density within the core 10 becomes excessively high and the magnetic flux flowing therethrough is obstructed because of a saturation of the magnetic flux therein. Therefore, energy transformation efficiency decreases. In order to avoid this drawback, the thickness of the secondary core must be larger than a certain value so as not to obstruct the magnetic flux therethrough. Thus the linear motor can not be made enough thinner.

SUMMARY OF THE INVENTION

An object of the present invention is therefore to provide a linear motor by which a high energy transformation efficiency is obtained while reducing a thickness thereof.

Another object of the present invention is to provide a linear motor wherein a saturation of magnetic flux does not occur in a core through which a magnetic flux flows.

To this end, the present invention is characterized by comprising (a) a primary magnetic means having a primary axis therealong and generating a traveling magnetic field along the primary axis;

(b) a secondary magnetic means having a secondary axis therealong parallel to the primary axis, an elongated core made of a magnetic material elongated along the secondary axis, a plurality of permanent magnet means attached to said core and spaced constantly from each other along the secondary axis so that direction of polarity of the permanent magnet means is in a plane defined by the primary axis and the secondary axis and intersects perpendicularly the secondary axis, the direction of polarity interchanging in turn from one magnet means to another; and (c) a support means supporting one of the primary magnetic means and the secondary magnetic means against the other of the primary magnetic means and the secondary magnetic means so that the former is slidable along its axis against the other.

DETAILED DESCRIPTION OF PREFERRED EMBODIMENTS

The present invention will be explained in more detail hereinafter by referring to the attached drawings for mere examples. Like numerals denote same components throughout the drawings.

Figure 1:
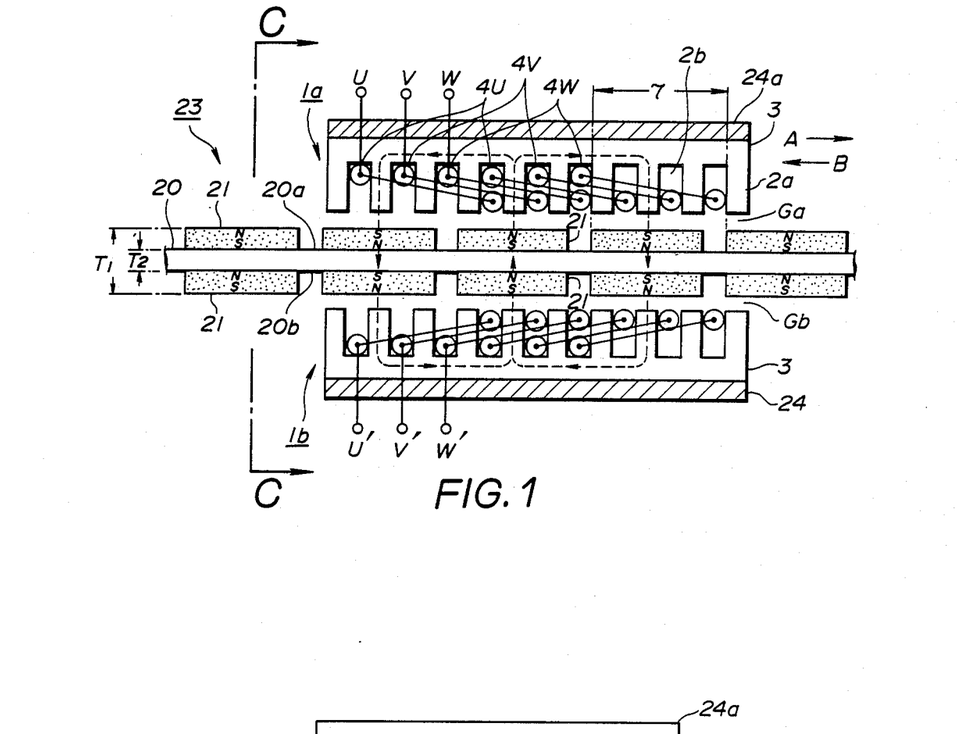
FIG. 1 is a partially cut-away front sketch of an embodiment present invention.
Figure 2:
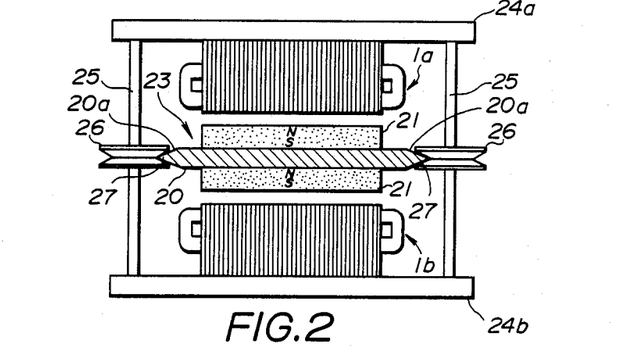
FIG. 2 is a sectional sketch taken along the line C—C of FIG. 1.

FIGS. 1 and 2 schematically shows a linear motor according to a preferred embodiment of the present invention.

Primary magnetic means $1a$ comprises a primary core 3, having laminated iron plates forming teeth $2a$ and grooves $2b$, and coils $4u, 4v, 4w$ disposed in the grooves $2b$ so as to wind around the teeth $2a$. In other ways the primary magnetic means $1a, 1b$ is generally the same as that of the above-mentioned conventional linear motors. When a three-phase electric current is supplied to the coils $4u, 4v, 4w$, the primary magnetic means generate a traveling magnetic field traveling along its axis in the direction shown by A or B in FIG. 1.

A secondary magnetic means 23 comprises an elongated secondary core plate 20 made of a magnetic material, permanent magnets 21 attached to an upper surface $20a$ and an lower surface $20b$ of the core plate 20. Each pair of permanent magnets 21 is attached to the core plate 20 so as to face against each other and sandwich the core plate 20 therebetween. An N pole of a magnet 21 faces an S pole of its mating magnet 21 through the core plate 20. Therefore, the direction of polarity of magnets 21 composing a pair coincides with each other. On the contrary, the direction of polarity of adjacent magnets 21 disposed on a same side of the core plate 20 is inverse from one to another. Thus the direction of magnetic polarity inverts from one pair of magnets 21 to another pair of magnets 21. Consequently, magnetic flux circulates as shown by dotted line in FIG. 1 through a pair of magnets 21, core plates and the primary magnet means $1a, 1b$.

According to this construction, magnetic flux does not saturate as it passes through the core plate 20 because the area wherein the magnetic flux passes through is generally equal to an area by which the magnets 21 are secured to the core plate, no matter what the thickness of the core plate 20. Therefore, a sufficient transformation efficiency is maintained even when a thickness of the core plate 20 is reduced in order to compactize the linear motor.

Primary magnetic means $1a, 1b$ are attached to a support means comprising a pair of support plates $24a, 24b$ which are connected to each other by means of a pair of support rods 25,25, FIG. 2. At a mid-part of the support rod 25,25, a roller 26,26 is secured thereto by means of a roller bearing (not shown) rotatably about the rod 25,25. The roller 26,26 has a groove formed therearound by which side edges 27,27 of the secondary magnetic means 23 is received. Thus the secondary magnetic means 23 is supported between the primary magnetic means $24a, 24b$ so that the core plate 20 is supported parallel to the primary magnetic means $1a, 1b$ and the distance to each of the primary magnetic means $1a, 1b$ is equal to each other.

When a three-phase electric current is provided to the primary magnetic means $1a, 1b$ and a traveling magnetic field is generated, the secondary magnetic means 23 is propelled by means of magnetic attraction and repulsion forces acting between the primary magnetic means $1a, 1b$ and the secondary magnetic means 23.

In a modified embodiment of the invention, the primary magnetic means is provided with a sensing means for sensing a relative displacement of the secondary magnetic means against the primary magnetic means in an axial direction, and a control means for controlling a direct electric current to be provided to the coil of the primary magnetic means according to the relative displacement of the two magnetic means. By controlling the electric current so as to generate a traveling magnetic field around the secondary magnetic means, the secondary magnetic means is also propelled along the axis. This modified embodiment of the present invention corresponds to an linearly extended brushless motor.

In a further modified preferred embodiment of the invention, in the first magnetic means, first coils are wound around adjacent pairs of teeth, for example pairs composed of $2a1$ and $2a2$, $2a3$ and $2a4$, and so on, while second coils are wound around another pairs of teeth, for example pairs composed of $2a2$ and $2a3$, $2a4$ and $2a5$, and so on. Direction of electric current in the first coils is inverse to that in the second coils so that S poles and N poles are generated by turns along the axis of the primary magnetic means and the magnetic polarity of each S or N poles inverse alternately when an alternating electric current is supplied to the coils. In this case also, a propelling force is exerted to the secondary magnetic means by the primary magnet means.

Figures 3, 4:
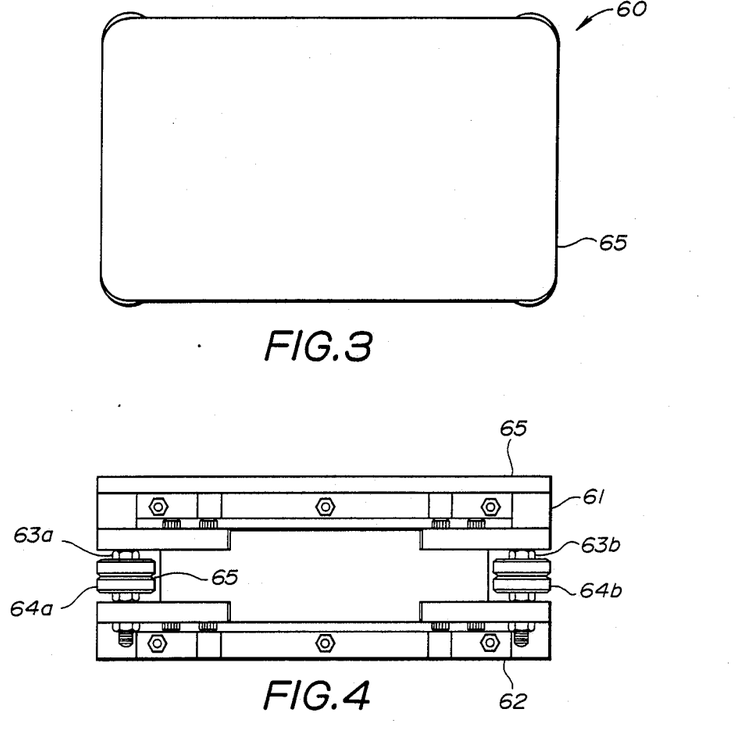
FIG. 3 is a plan view of a primary magnetic means according embodiment of the present invention.
FIG. 4 is a front elevation view of a primary magnetic means according to an embodiment of the present invention.
Figure 5:
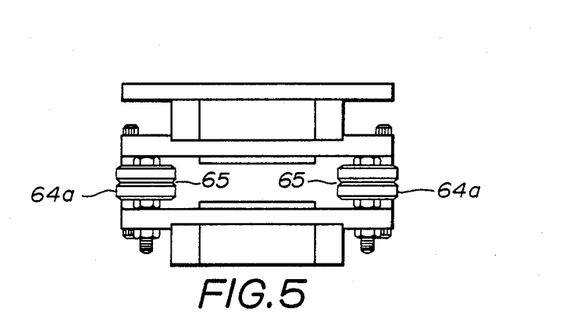
FIG. 5 is a side elevation view of a primary magnetic means according to an embodiment of the present invention.

FIGS. 3 to 5 show an example of a preferred embodiment of a primary magnetic means 60. The primary magnetic means 60 comprises a top plate 65, an upper covering 61 accommodating electro-magnets (not shown) therein, a lower covering 62 also accommodating electro magnets (not shown), connection posts 63a,63b connecting the upper covering 61 and the lower covering 62 so that they face parallel to each other, and roller supports 64a,64b attached to a mid-part of the connection posts 63a,63b so that it is rotatable about the connection posts 63a,63b. The roller supports 64a,64b are positioned exactly at a midpoint of the connection posts 63a,63b so that a distance from the roller supports 64a,64b to the upper covering 61 and lower covering 62 is equal to each other, FIG. 4. FIG. 5 shows a side elevation view of the same primary magnetic means 60. A pair of connection posts 63a1,63a2 and a pair of roller supports 64a,64a are seen from this side. A groove 65,65 is formed in a mid-part of the roller supports 64a,64a.

Figure 6:
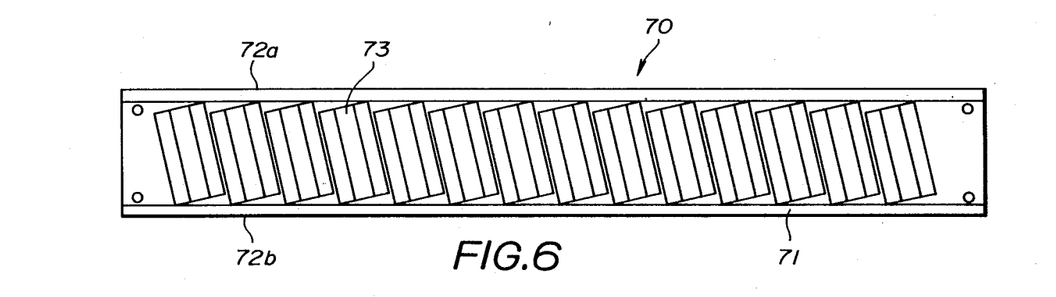
FIG. 6 is a plan view of a secondary magnetic means according to an embodiment of the present invention.
Figures 7, 8:
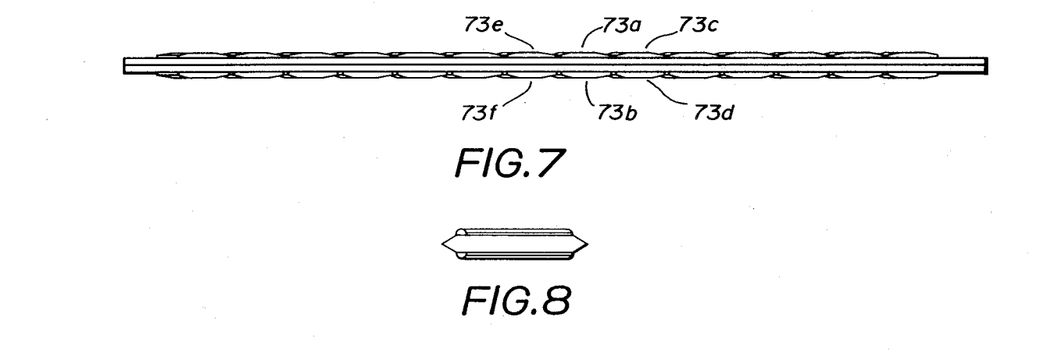
FIG. 7 is a front elevation view of a secondary magnetic means according to an embodiment of the present invention.
FIG. 8 is a side elevation view of a secondary magnetic means to an embodiment of the present invention.

FIGS. 6 to 8 show an embodiment of a secondary magnetic means 70. As shown in FIG. 6, the secondary magnetic means 70 comprises an elongated core plate 71 having a pair of wedge-shaped edges 72a,72b along a pair of elongated sides thereof. A plurality of permanent magnets 73 are secured to an upper and a lower surfaces of the core plate 71. The permanent magnets 73 are in a generally rectangular parallelepiped form of which a pair of longer edges are cut off therefrom. Direction of a longitudinal axis of the permanent magnets 73 is slanting along the longitudinal axis of the core plate 71. An N pole of a magnet 73a faces upwards while the magnet is secured to the core plate 71 at its S pole. Direction of polarity of a permanent magnet 73b opposing to the magnet 73a through the core plate 71 coincides with that of the magnet 73a. Polarity of a pair of magnets 73c,73d and 73e,73f adjacent to the magnets 73a,73b is inverse against the later.

When the primary magnetic means 60 and the secondary magnetic means 70 are to be operated, the secondary magnetic means is inserted between the upper covering 61 and the lower covering 62 of the primary magnetic means 60 so that the side edges 72a,72b are received by respective grooves 65 formed in four roller supports 64. The secondary magnetic means 70 is capable of displacing along an axis thereof keeping parallelism with the primary magnetic means as the roller supports 64 rotate around the connection posts 63. Thus, the secondary magnetic means 70 is propelled along the axis as a traveling magnetic means is generated by means of electromagnets (not shown) accommodated within the primary magnetic means.

Figure 9:
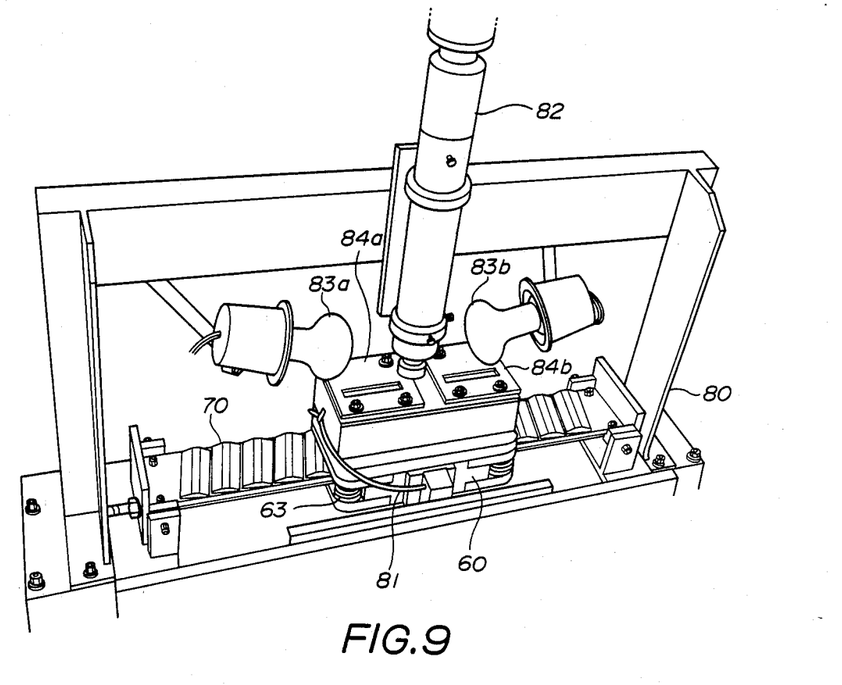
FIG. 9 shows an example wherein a linear motor according to the present invention is employed.

FIG. 9 shows a carriage wherein above-mentioned linear motor is employed. In this case, the secondary magnetic means 70 is fixed to a framework 80 at its both ends. The primary magnetic means 60 is supported by the secondary magnetic means 70 through the roller supports 63 so that the primary magnetic means 60 is slidable along an axis of the secondary magnetic means 70. Electricity is supplied to the primary magnetic means 60 through an electric cable 81 having a slacking to permit a movement thereof within the length of the secondary magnetic means 70. A microscope 82 and a pair of lights 83a,83b are secured to the framework 80. An object (not shown) is secured at a top of the primary magnetic means 60 with a help of holders 84a,84b. The primary magnetic means 60 is displaced along the secondary magnet means so that the microscope 82 is properly located onto an object.

In the above embodiments, the secondary magnetic means is fixed to a stationary structure and the primary magnetic means is supported form the former slidably. But, the construction may be inverse, that is, a primary magnetic means may be fixed to a stationary structure and a secondary magnetic means may be supported form the primary magnetic means slidably.

As explained above, present invention provides a linear motor which is small in thickness while maintaining enough propulsion force. Efficiency of the linear motor according to the present invention is improved also yet making the motor smaller because a saturation of magnetic flux is eliminated by constructing the secondary magnetic means so that the magnetic flux within the core plate of the secondary magnetic means flows traversing the thickness thereof.

What is claimed is:

1. A linear motor comprising:
    (a) primary magnetic means having a primary axis therealong for generating a traveling magnetic field along said primary axis;
    (b) secondary magnetic means, adjacent said primary magnetic means and having a secondary axis therealong parallel to said primary axis, having an elongated member made of a magnetic material and elongated along said secondary axis, a plurality of pairs of permanent magnet means respectively attached to opposite sides of said member, spaced at a constant distance from each other along said secondary axis, disposed so that a direction of polarity of each said permanent magnet means is in a plane defined by said primary axis and said secondary axis and which intersects at a perpendicular to said secondary axis with said direction of polarity alternating from one magnet means to each magnet means adjacent thereto in a direction perpendicular to said primary axis, such that all said pairs of said magnet means have opposite polarities facing one another across said secondary magnet means; and
    (c) a support means supporting a supported portion which is one of said primary magnetic means and said secondary magnetic means, against the other of said primary magnetic means and said secondary magnetic means which is a slidable portion so that the slidable portion can slide along its axis relative to the supported portion.

2. A linear motor according to claim 1, wherein said primary magnetic means comprises a electro-magnet means for generating said traveling magnetic field.

3. A linear motor according to claim 2, wherein said electro-magnet means comprises a primary core having a base plate extending along said primary axis and a plurality of teeth projecting perpendicular to said primary axis towards said secondary magnetic means, and coils wound around said teeth so as to generate said traveling magnetic field.

4. A linear motor according to claim 3, wherein said coil comprises three sets of coils, each set of coils comprising at least one coil, wound around three adjacent teeth, said coils composing one of said sets overlapping with coils composing another set, said sets of coils being connected to a three-phase electric current, whereby said traveling magnetic field is generated along the first axis of said primary magnetic means.

5. A linear motor according to claim 3, wherein said coil comprises two sets of coils, each set of coils comprising at least one coil, said coil wound around a pair of adjacent teeth, said coils composing one of said sets overlapping with coils composing another set, said sets of coils being connected to an alternating electric current, whereby said traveling magnetic field is generated along the first axis of said primary magnetic means.

6. A linear motor according to one of claims 2 to 5, wherein said primary magnetic means comprises a pair of electro-magnet means facing to each other and said secondary magnetic means is disposed between said pair of electro-magnet means.

7. A linear motor according to one of claims 1 to 5, wherein said permanent magnet means comprises a pair of permanent magnets attached to said elongated core so as to sandwich said core from both sides, direction of polarity of one of said pair of permanent magnets coinciding with that of the other, direction of polarity according to said pairs of permanent magnets interchanging from one pair to another.

8. A linear motor according to claim 6, wherein said permanent magnet means comprises a pair of permanent magnets attached to said elongated core so as to sandwich said core from both sides, direction of polarity of one of said pair of permanent magnets coinciding with that of the other, direction of polarity according to said pair of permanent magnets interchanging from one pair to another.

9. A linear motor according to claim 8, wherein said support means connects said pair of electro-magnet means so as to face parallel to each other and supports said secondary magnetic means equi-distantly from said pair of electro-magnet means so as to be slidable along said secondary axis.

10. A linear motor comprising:
(a) a pair of primary magnet means disposed in a spaced-apart opposed relation, the primary magnet means defining first and second axes, with the first axis extending between the pair of primary magnetic means, and the second axis extending perpendicularly to the first axis, said pair of primary magnet means for generating a traveling magnetic field;
(b) a secondary magnetic means extending parallel to the second axis of the primary magnetic means, at least a section of the secondary magnetic means being interposed between the pair of primary magnetic means, the secondary magnetic means including a plurality of pairs of permanent magnet units aligned therealong at equal intervals, wherein each of said permanent magnet units have south and north poles aligned in a direction parallel to the first axis of the primary magnetic means, a first type pole of each magnet of the pairs of permanent magnet units being adjacent a second and opposite type pole of the other of said each of the pairs of permanent magnet units, each said pair facing one of each type of poles to the pair of primary magnetic means, from its opposite ends, respectively, when the corresponding magnet unit is brought to a position between the pair of primary magnetic means, whereby a line of magnetic force extends between the pair of primary magnetic means; and
(c) a support means interconnecting the primary and secondary magnetic means so that one of the primary and secondary magnetic means is axially movable relative to each other, in a direction parallel to said first axis.

11. A linear motor according to claim 1, wherein said primary magnetic means comprises a electromagnet means for generating said traveling magnetic field.

12. A linear motor according to claim 10, and wherein each of said permanent magnet units comprise a pair of magnets attached to said elongated core so as to sandwich said core from both opposite sides, each opposite pair of magnets having polarity such that a north pole of one surface faces a south pole of the other.

13. A linear motor according to claim 10, wherein said secondary magnetic means comprises an elongated core elongated along said second axis, said permanent magnet units being attached to the core.

14. A linear motor according to claim 12, wherein said elongated core is made of a magnetic material.

15. A linear motor according to claim 14, wherein said support means connects said pair of primary magnetic means so as to face parallel to each other and supports said secondary magnetic means equidistantly from said pair of electromagnet means so as to be slidable along said secondary axis.

16. A linear motor according to claim 15, wherein said elongated core is a thin plate, and said permanent magnets are thin plates.

* * * * *